(12) United States Patent
Huang et al.

(10) Patent No.: US 8,459,981 B2
(45) Date of Patent: *Jun. 11, 2013

(54) QUANTITATIVE POWDER-PROVIDING MODULE

(75) Inventors: Ke Ming Huang, Hsin-Chu (TW); Kwo Yuan Shi, Hsin-Chu (TW)

(73) Assignee: Microjet Technology Co., Ltd., Hsin-Chu (TW)

( * ) Notice: Subject to any disclaimer, the term of this patent is extended or adjusted under 35 U.S.C. 154(b) by 74 days.

This patent is subject to a terminal disclaimer.

(21) Appl. No.: 13/033,865

(22) Filed: Feb. 24, 2011

(65) Prior Publication Data

US 2011/0215117 A1    Sep. 8, 2011

(30) Foreign Application Priority Data

Mar. 4, 2010    (CN) .......................... 2010 1 0134294

(51) Int. Cl.
 *B28B 17/00* (2006.01)
(52) U.S. Cl.
 USPC ........................... 425/375; 222/233; 222/409
(58) Field of Classification Search
 USPC ................. 425/174.4, 375, 130, 90; 264/308, 264/497; 118/712, 66, 602, 600, 308, 309, 118/313, 314, 315, 316; 222/409, 414, DIG. 1, 222/233, 238, 367, 361, 336, 354, 355, 216, 222/303, 369, 412, 413; 141/8, 98; 366/329.1, 366/329.2
 See application file for complete search history.

(56) References Cited

U.S. PATENT DOCUMENTS

2006/0204603 A1*    9/2006   Leuterer et al. ............ 425/174.4

FOREIGN PATENT DOCUMENTS

| CN | 2376456 | 5/2000 |
|----|---------|--------|
| CN | 1283578 | 2/2001 |
| CN | 201157904 | 12/2008 |

* cited by examiner

*Primary Examiner* — Yogendra Gupta
*Assistant Examiner* — Ninh Le
(74) *Attorney, Agent, or Firm* — Muncy, Geissler, Olds & Lowe, PLLC (57) ABSTRACT

The present invention is related to a quantitative powder-providing module, adaptive to a 3D prototyping mechanism, at least includes: a powder-providing tank, which is used for storing a constructive powder and having a powder-dropping opening; and a powder-propelling roller located inside the powder-providing tank and having a plurality of recesses for receiving the constructive powder; when one of the plurality of recesses corresponds to the powder-dropping opening, the constructive powder received in the corresponding recess is output through the powder-dropping opening; wherein each of the plurality of recesses has plural sections, and the amount of powder received in each of the plural sections of the recess is increased from the center of the recess, toward the two sides of the recess.

5 Claims, 9 Drawing Sheets

QUANTITATIVE POWDER-PROVIDING MODULE

CROSS REFERENCE TO RELATED APPLICATION

This application claims the benefits of the China Patent Application Serial Number 201010134294.9, filed on Mar. 4, 2010, the subject matter of which is incorporated herein by reference.

BACKGROUND OF THE INVENTION

1. Field of the Invention

The present invention relates to a quantitative powder-providing module and, more particularly, to a quantitative powder-providing module adaptive to a 3D prototyping mechanism.

2. Description of Related Art

Rapid Prototyping technology, which is abbreviated as RP technology, is a technology derived from the idea, which stacking of plural layers forms the pyramid. The RP technology enables the rapid and low-cost realization of an idea raised by a designer in a short period of time, for the presentation to the public. The main feature of the RP technology is the rapid realization, which can transform a design projection having any kind of complicated shape into a 3D entity model, both automatically and rapidly, without the need to employing any cutters, mold, and jig. Thus, the RP technology can shorten the research & development cycle of a new product significantly and the research & developing cost thereof, ensure the appearance of the new product to the market at a pre-determined date, and raise the successful percentage of the one-time developing process of the new product. The RP technology also provides a more complete and more convenient product-design communication tool, not only between different technicians, but also between technicians and non-technology personnel, for example, the decision-maker of an enterprise or the user of the new product. As a result, both of the competitive ability of the new product in the market, and the rapid-responding ability of the enterprise to the change of market are increased significantly.

Currently, the RP technology has been developed to a point that it combines the project-printing technology, with the precision-positioning technology of the vehicle together, for manufacturing a 3D entity model. The manufacturing process of the RP technology now includes: paving a layer of constructive powder on the vehicle, and ink-projecting printing high-viscosity gluing liquid on portions of the paved constructive powder, wherein the high-viscosity gluing liquid and the constructive powder are sticking with each other and curing. The above manufacturing process should be repeated for many times, in order to stack the layers together to form the 3D entity model.

During the paving process of powder, the provision of the constructive powder can be divided into two categories, i.e. the bottom powder-provision and the top powder-provision. In the top powder-provision, the thickness of the powder being paved is determined by the provision of the constructive powder of a fixed amount. But, the amount of powder provided in this manner is quite difficult to be controlled. Besides, in the prior art, the constructive powder is provided through the rotation of the powder-propelling roller located inside the powder-providing tank. However, the area of every cross-section of the recess structure of the conventional powder-propelling roller is the same, which means the amount of the falling powder in every unit-length is the same.

Figure 1:
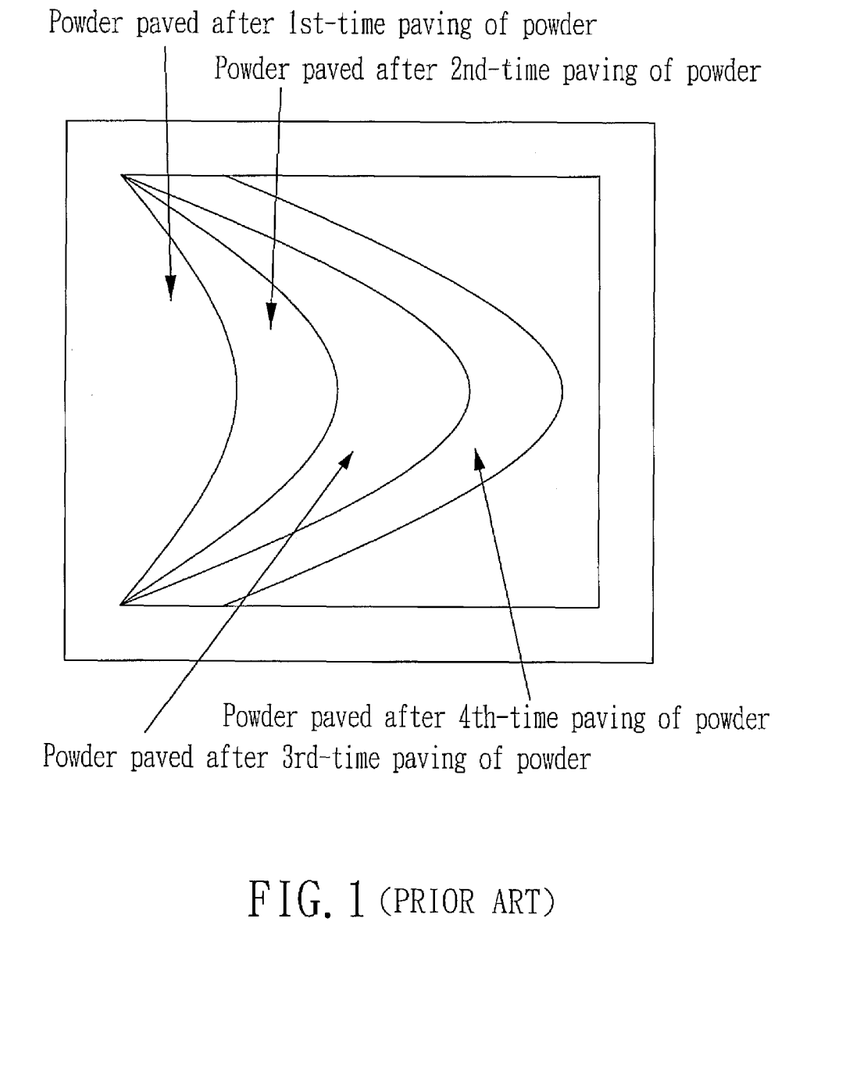
FIG. 1 is a schematic diagram displaying the conventional paving of powders.

Please refer to FIG. 1, which is a schematic diagram displaying the conventional paving of powders. As shown in FIG. 1, during the paving of powder, due to the above-mentioned reasons, the amount of the powder paved at the center is much larger than that of the powder paved at the two sides, causing the powder cannot be paved evenly over a whole surface and making the difference between the amount of the constructive powder at the center and that of the constructive powder at the two sides being increased with the number of times of paving powder.

Therefore, a quantitative powder-providing module capable of obviating the drawbacks of the conventional powder-providing device is demanded by the industry.

SUMMARY OF THE INVENTION

It is one object of the present invention to provide a quantitative powder-providing module, capable of obviating the drawbacks of the conventional powder-providing device, such as the amount of powder provided being difficult to be controlled, and the constructive powder being spread outwardly from the center during the paving of powder, resulting in the amount of the powder paved at the center being much larger while the powder paved at the two sides being much smaller, causing the powder cannot be paved evenly over a whole surface.

To achieve the object, the quantitative powder-providing module according to one preferred embodiment of the present invention, adaptive to a 3D prototyping mechanism, at least includes: a powder-providing tank, which is used for storing a constructive powder and having a powder-dropping opening; and a powder-propelling roller located inside the powder-providing tank and having a plurality of recesses for receiving the constructive powder; when one of the plurality of recesses corresponds to the powder-dropping opening, the constructive powder received in the corresponding recess is output through the powder-dropping opening; wherein each of the plurality of recesses has plural sections, and the amount of powder received in each of the plural sections of the recess is increased from the center of the recess, toward the two sides of the recess.

DETAILED DESCRIPTION OF THE PREFERRED EMBODIMENT

Other objects, advantages, and typical embodiment of the present invention will be described in the following detailed description. It is to be understood that many other possible modifications and variations can be made without departing from the spirit and scope of the present invention. In addition, the following detailed description and the accompanying drawings are substantially used as an illustration, not for limiting the scope of the present invention.

Figure 2A:
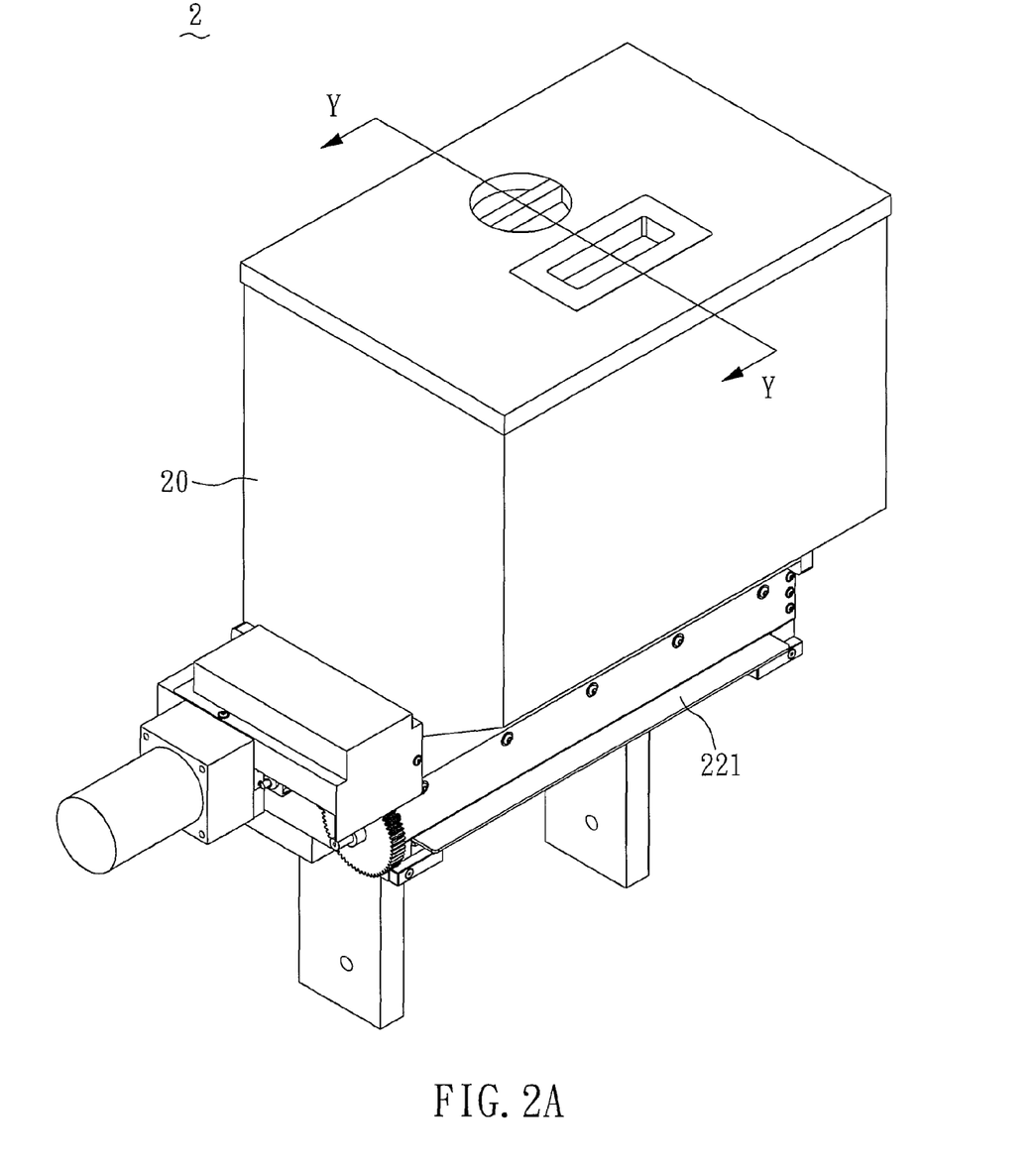
FIG. 2A is a perspective view displaying the 3D structure of the quantitative powder-providing module according to a preferred embodiment of the present invention.
Figure 2B:
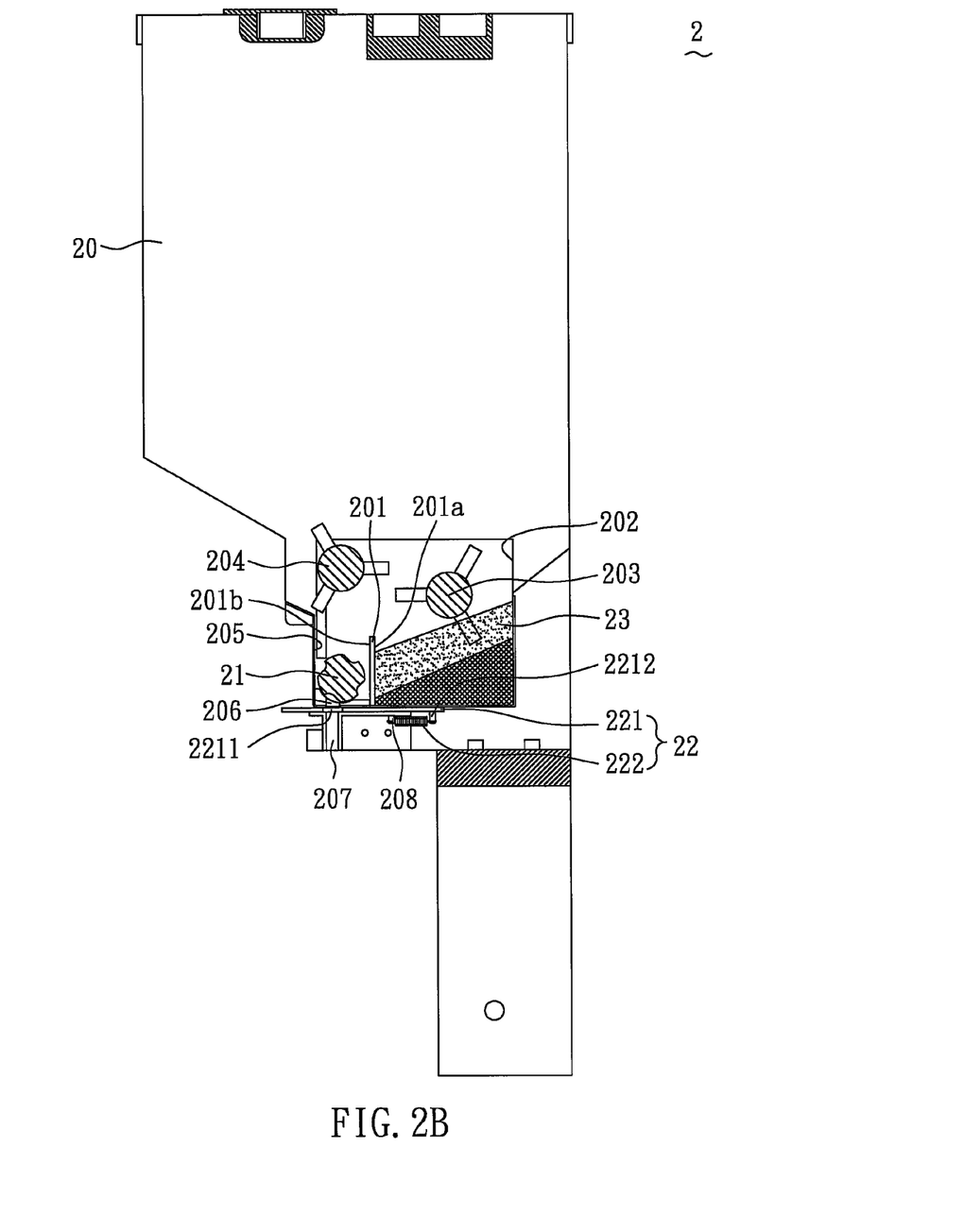
FIG. 2B is a cross-sectional view taken along the YY line of FIG. 2A.

With reference to FIG. 2A and FIG. 2B, wherein FIG. 2A is a perspective view displaying the 3D structure of the quantitative powder-providing module according to a preferred embodiment of the present invention, while FIG. 2B is a cross-sectional view taken along the YY line of FIG. 2A. As shown in FIG. 2A and FIG. 2B, the quantitative powder-providing module 2 of the present invention is adaptive to a 3D prototyping mechanism, mainly for outputting a constructive powder quantitatively and at least includes: a powder-providing tank 20, a powder-propelling roller 21, and a shutting device 22. The powder-providing tank 20 has a hollow tank-structure, for storing the constructive powder 23 therein. Beside, the powder-providing tank 20 has a back plate 201, a first inner wall 202, a first powder-stirring roller 203, a second powder-stirring roller 204, and a second inner wall 205. The constructive powder 23 is stacked between a first side surface 201a of the back plate 201 and the first inner wall 202 of the powder-providing tank 20. The constructive powder 23 is raising by the stirring of the first powder-stirring roller 203. Then, with the rotation of the second powder-stirring roller 204, the constructive powder 23 is falling onto the position between the second side surface 201b of the back plate 201 and the second inner wall 205 of the powder-providing tank 20. As a result, the over-loading of the excess amount of the falling constructive powder beyond the powder-propelling roller 21 can be avoided, and the block of the falling constructive powder onto the powder-propelling roller 21 can also be prevented from happening, enabling the powder-propelling roller to rotate normally. Furthermore, the bottom portion of the powder-providing tank 20 further equips with a powder-dropping opening 206 and a powder-dropping channel 207.

Figure 3A:
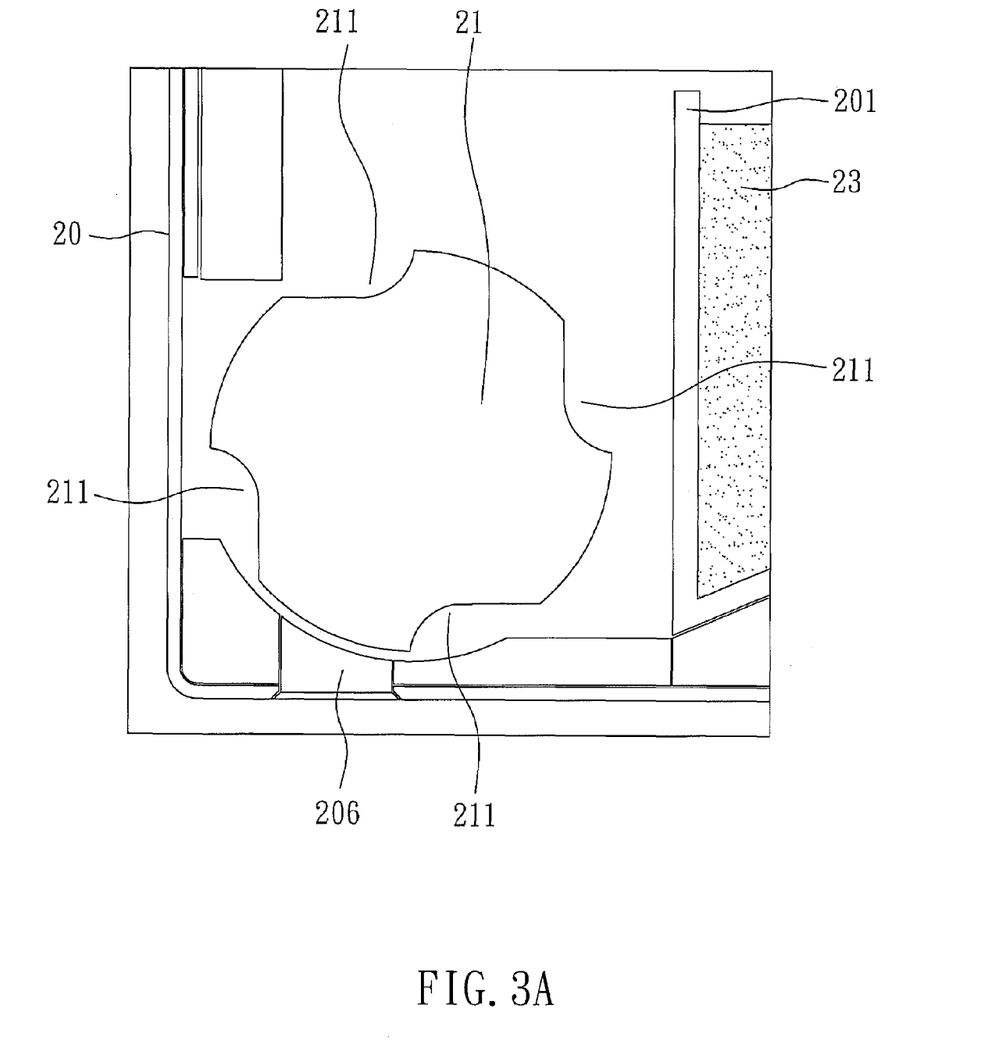
FIG. 3A is a schematic diagram displaying the powder-providing tank and the powder-propelling roller of FIG. 2B.
Figure 3B:
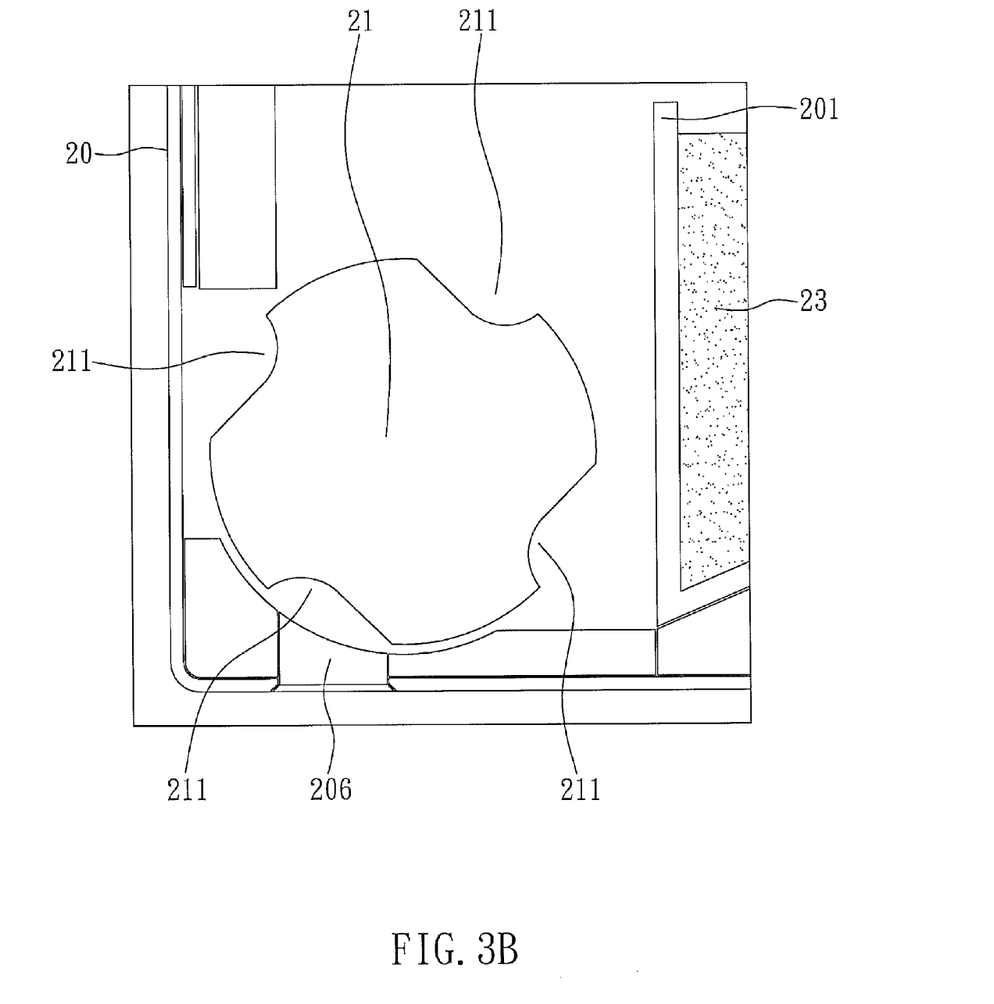
FIG. 3B is a schematic diagram displaying the action of the powder-providing tank and the powder-propelling roller of FIG. 3A, during the provision of powder.

Please refer to FIG. 3A, in accordance with FIG. 2B, wherein FIG. 3A is a schematic diagram displaying the powder-providing tank and the powder-propelling roller of FIG. 2B. As shown in the figure, the powder-propelling roller 21 is located inside the powder-providing tank 20 and being nearby to the powder-dropping opening 206. The powder-propelling roller 21 is mainly used to provide the constructive powder 23 quantitatively, which is required for paving the whole surface of a constructive platform (not shown in the figure) once. The powder-propelling roller 21 has a plurality of recesses 211, where each of the plurality of recesses 211 is used to receive the constructive powder 23. When the plurality of recesses 211 of the powder-propelling roller 21 is not connected with the powder-dropping opening 206, the constructive powder 23 cannot be output (as shown in FIG. 3A). On the contrary, when one of the plurality of recesses 211 of the powder-propelling roller 21 corresponds to the powder-dropping opening 206, the constructive powder 23 received in the corresponding recess is output through the powder-dropping opening 206 (as shown in FIG. 3B).

Besides, the quantitative powder-providing module 2 of the present invention can modulate the number of the plurality of recesses 211 of the powder-propelling roller 21 being corresponding to the powder-dropping opening 206, during the rotation of the powder-propelling roller 21 based on the requirement for paving different thickness of the constructive powder, in order to control the output quantity of the constructive powder 23 for preventing the waste of the constructive powder 23. For instance, if the upper limit and lower limit of the thickness of the paving powder on the constructive platform is 0.12 mm and 0.08 mm, respectively. And one of the plurality of recesses 211 of the powder-propelling roller 21 can receive the constructive powder 23 with the thickness at least of 0.04 mm. Therefore, when a constructive powder 23 with the thickness of 0.08 mm is to be paved on the constructive platform, a step motor (not shown in the figure) needs to rotate twice for driving two of the plurality of recesses 211 of the powder-propelling roller 21 to be connected with the powder-dropping opening 206, letting the constructive powder 23 received in these recess 211 dropping outwardly through the powder-dropping opening 206. On the other hand, when a constructive powder 23 with the thickness of 0.12 mm is to be paved on the constructive platform, the step motor needs to rotate three-times for letting the constructive powder 23 received in three of the plurality of recesses 211 of the powder-propelling roller 21 dropping outwardly through the powder-dropping opening 206. As a result, the amount of extra constructive powder 23 that is going to be pushed into a recovery tank (not shown in the figure) can thus be reduced.

Figure 4A:
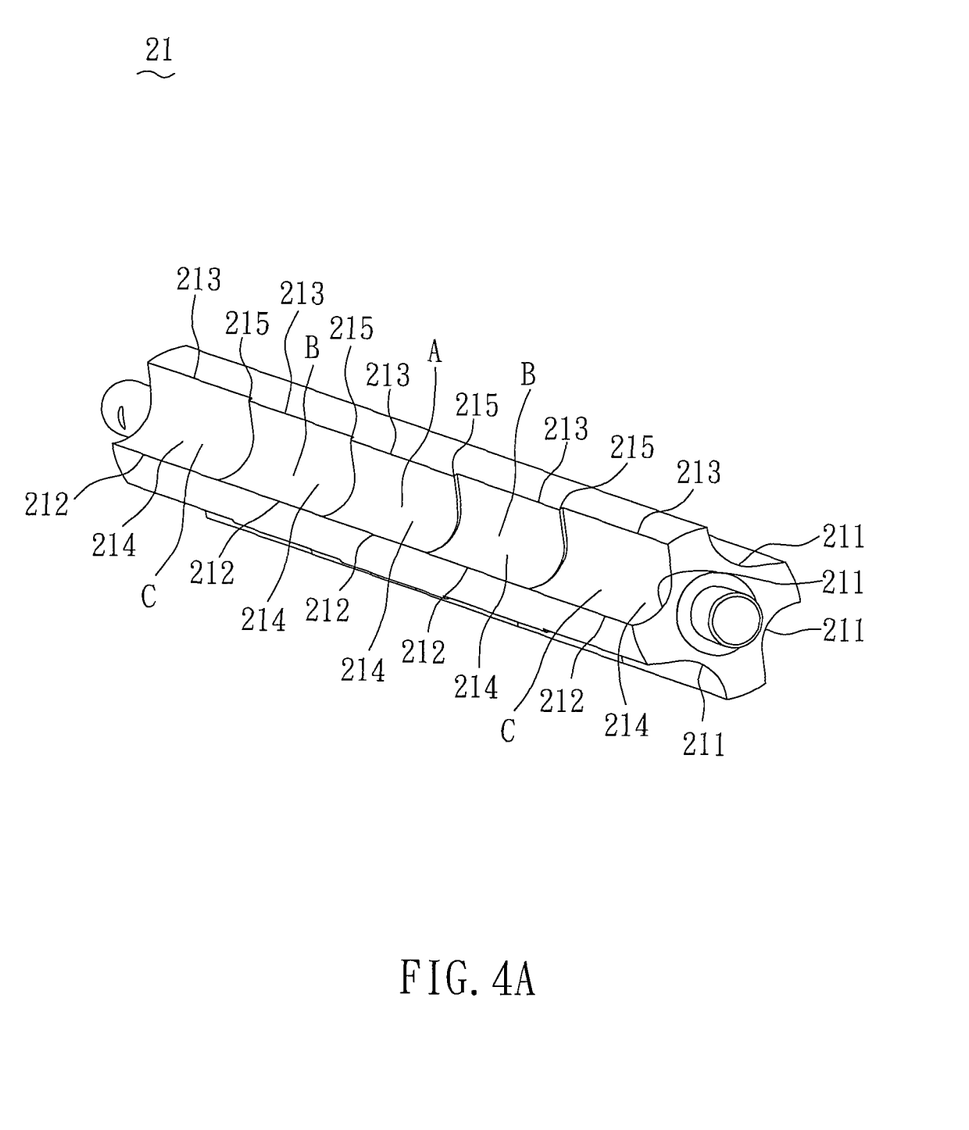
FIG. 4A is a perspective view displaying the 3D structure of the powder-propelling roller of FIG. 2B.
Figure 4B:
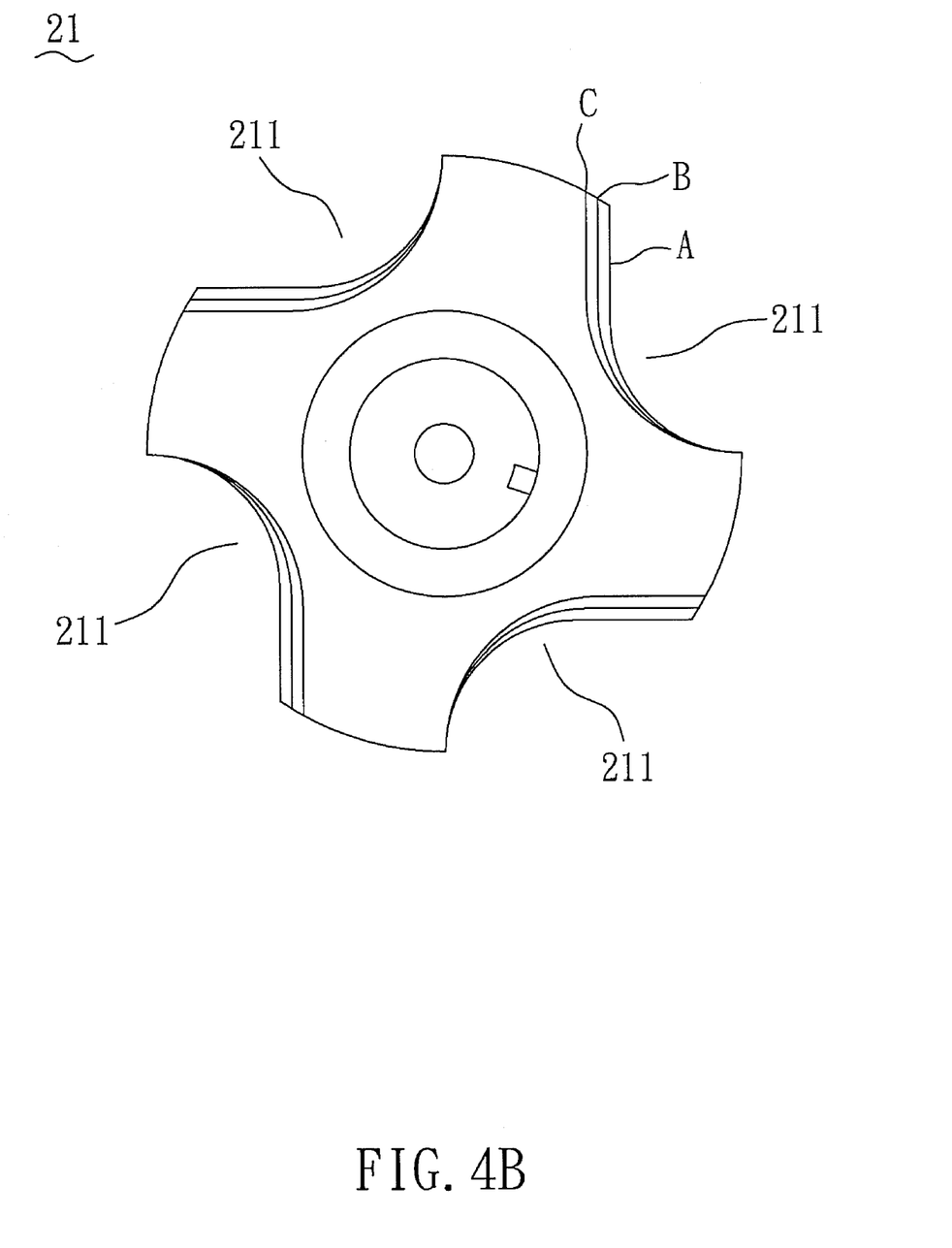
FIG. 4B is a front-view of the powder-propelling roller of FIG. 2B.

With reference to FIG. 4A and FIG. 4B, wherein FIG. 4A is a perspective view displaying the 3D structure of the powder-propelling roller of FIG. 2B, while FIG. 4B is a front-view of the powder-propelling roller of FIG. 2B. As shown in FIG. 4A and FIG. 4B, every recess 211 of the powder-propelling roller 21 of the present invention has plural sections. All of the plural sections are consisted of a concave-curve receiving tank 214 located between a first side-edge 212 and a second side-edge 213, which are both parallel to the axis of the powder-propelling roller 21. Besides, the second side-edge 213 of each of the plural sections are not located at the same lateral position, wherein a lateral difference 215 is formed between the second side-edges 213 of two nearby sections. In every recess 211, the depth of the concave-curve receiving tanks 214 of every section of the recess 211 is increased from the section located at the center of the recess 211, toward the sections located at the two ends of the recess 211.

In the present embodiment, every recess 211 includes, for example but not limited to, an A section, two B sections, and two C sections. Wherein, the A section is located at the center of the recess 211, while the two B sections are located at the right-hand side and the left-hand side of the A section, respectively. In addition, the two C sections are respectively located at the sides, which are both opposing to the A section, of the two B sections. The depth of the recess in the A section is minimum, which means the recess in the A section receives the minimum amount of powder. Then, the depth of the recess in the section B is larger than that of the recess in the A section, which means the recess in the B section receives a little more powder than the recess in the A section. In addition, being compared with the recesses in the A section and the B section, the depth of the recess in the C section is the largest, meaning that the recess in the C section can receive the largest amount of powder therein.

In summary, among the above 5 sections of the recess, the amount of powder received in each of the 5 sections is increased from the section located at the center of the recess, toward the sections located at the two sides of the recess, i.e. A<B<C. Thus, by having the specially-designed structure, the amount of powder received in each of the plural sections of the recess of the powder-propelling roller 21, i.e. the above-mentioned A, B and C sections, is increased from the center of the recess, toward the two sides of the recess. As a result, the constructive powder 23 can be paved evenly on the whole surface of the constructive platform. In this manner, the drawback shown in FIG. 1 can be obviated, which the difference between the amount of the constructive powder paved at the center and that of the constructive powder paved at the two sides is increased with the number of times of paving powder.

Figure 5A:
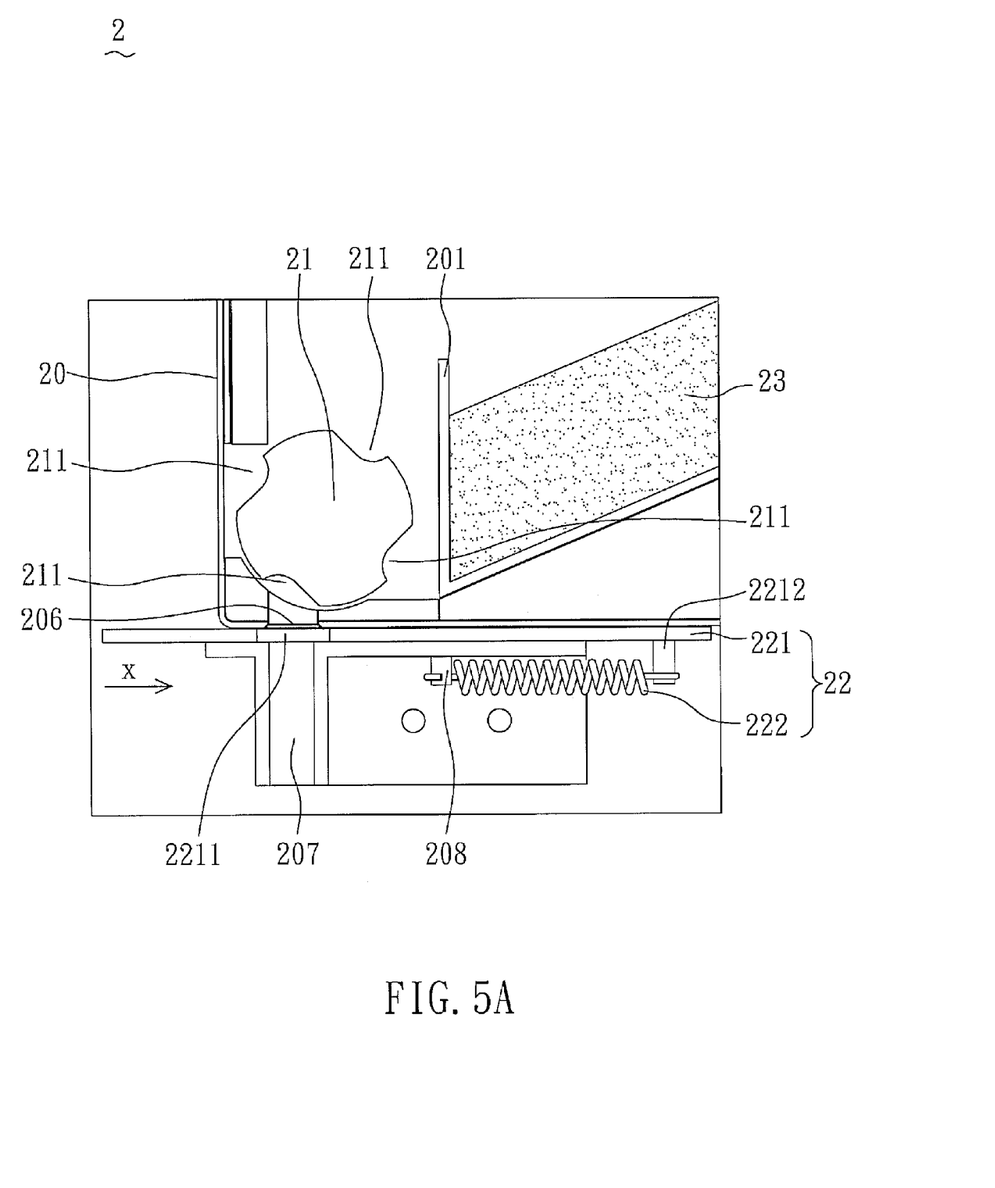
FIG. 5A is a schematic diagram of the shutting device and the powder-dropping channel of FIG. 2B.

Please refer to FIG. 5A, which is a schematic diagram of the shutting device and the powder-dropping channel of FIG. 2B. As shown in FIG. 5A, the shutting device 22 of the quantitative powder-providing module 2 of the present invention includes a board-like element 221 and an elastic element 222, wherein the board-like element 221 is movable and has an opening 2211 and a first fixture portion 2212. One side of the elastic element 222 is connected with the first fixture portion 2212, and the other side of the elastic element 222 is connected with a second fixture portion 208 of the powder-providing tank 20. When the powder-providing tank 20 provides powder, the printing module (not shown in the figure) of the 3D prototyping mechanism pushes the board-like element 221 to move along the X-direction of FIG. 5A, making the opening 2211 of the board-like element 221 to be connected with the powder-dropping opening 206. At this time, the constructive powder 23 received in one of the plurality of recesses 211 of the powder-propelling roller 21 is output through the powder-dropping opening 206 and the powder-dropping channel 207 (as shown in FIG. 5A).

Figure 5B:
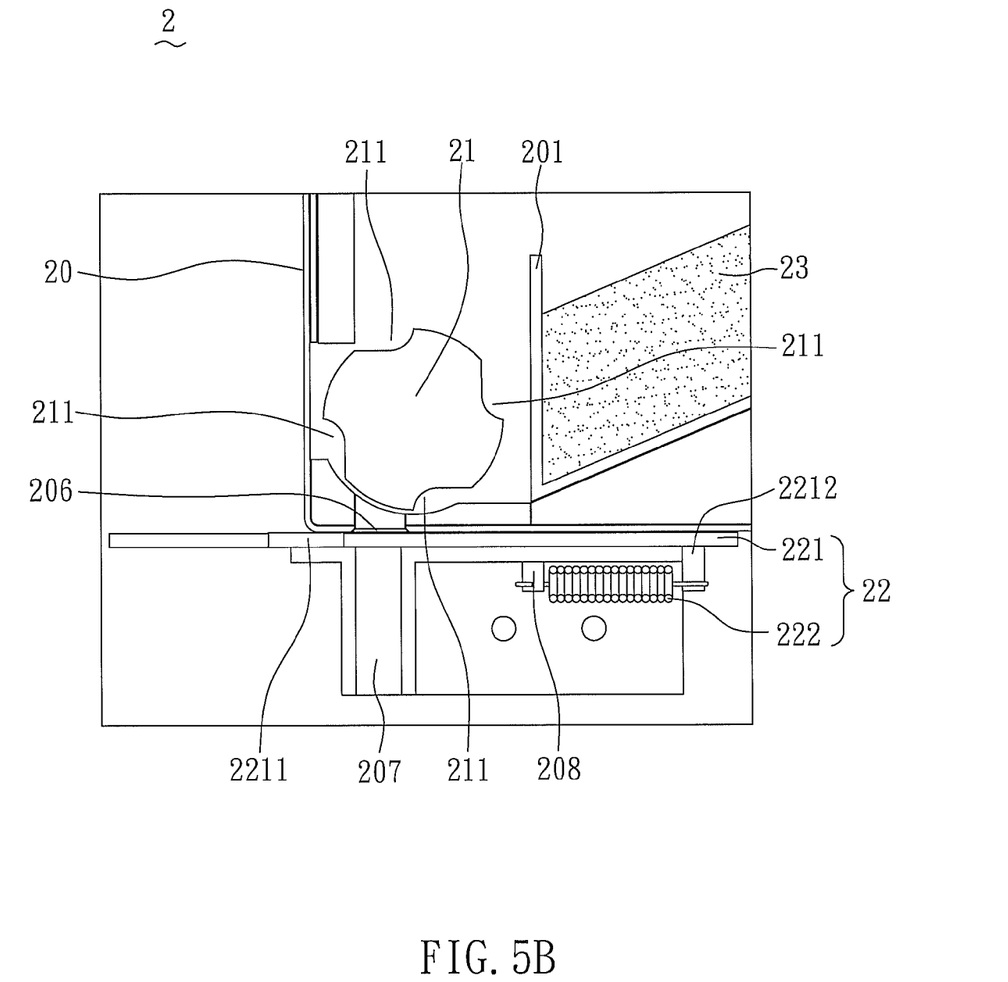
FIG. 5B is a schematic diagram displaying the action of the shutting device and the powder-dropping channel of FIG. 5A, when the opening of the shutting device is not connected with the powder-dropping opening.

On the contrary, when the powder-provision of the powder-providing tank 20 has been finished, the printing module departs from the board-like element 221. At this time, the board-like element 221 moves along the direction opposite to the X-direction of FIG. 5A, due to the elastic recovery force of the elastic element 222. Thus, the opening 2211 of the board-like element 221 is not connected with the powder-dropping opening 206 (as shown in FIG. 5B), for preventing further dropping of the constructive powder. Therefore, during the operation of the 3D prototyping mechanism, the shutting device 22 can indeed prevent the minor dropping of the constructive powder 23 from the interior of the powder-providing tank 20, for minimizing the pollution to the working environment.

In summary, the quantitative powder-providing module of the present invention can modulate the number of the plurality of recesses of the powder-propelling roller being corresponding to the powder-dropping opening, during the rotation of the powder-propelling roller based on the requirement for paving different thickness of the constructive powder, in order to control the output quantity of the constructive powder, and to reduce the amount of extra constructive powder being pushed into the recovery tank. Thus, the waste of the constructive powder can be prevented and the production cost is also reduced. In addition, each of the plurality of the recesses of the powder-propelling roller of the present invention has plural sections, and the amount of powder received in these sections of the recess is increased from the center of the recess, toward the two sides of the recess. Therefore, the constructive powder can be paved evenly, and the drawback of the lack of constructive powder paved at the two sides can be obviated.

Hence, it is to be understood that many other possible modifications and variations can be made without departing from the spirit and scope of the present invention as hereinafter claimed.

What is claimed is:

1. A quantitative powder-providing module, adaptive to a 3D prototyping mechanism, at least includes:

a powder-providing tank, which is used for storing a constructive powder and having a powder-dropping opening; and a powder-propelling roller located inside the powder-providing tank and having a plurality of recesses for receiving the constructive powder; when one of the plurality of recesses corresponds to the powder-dropping opening, the constructive powder received in the corresponding recess is output through the powder-dropping opening;

wherein each of the plurality of recesses has plural sections, and an amount of powder received in each of the plural sections of the recess is increased from a center of the recess, toward two ends of the recess.

2. The quantitative powder-providing module as claimed in claim 1, wherein the quantitative powder-providing module controls the output quantity of the constructive powder by modulating the number of the plurality of recesses of the powder-propelling roller being corresponding to the powder-dropping opening.

3. The quantitative powder-providing module as claimed in claim 1, wherein every recess of the powder-propelling roller has plural sections; all of the plural sections are consisted of a concave-curve receiving tank located between a first side-edge and a second side-edge, which are both parallel to an axis of the powder-propelling roller; the second side-edge of each of the plural sections are not located at same lateral position, wherein a lateral difference is formed between the second side-edges of two nearby sections; and depth of the concave-curve receiving tanks of every section of the recess is increased from the section located at the center of the recess, toward the sections located at the two ends of the recess.

4. The quantitative powder-providing module as claimed in claim 1, further comprising a shutting device including a board-like element and an elastic element, wherein the board-like element has an opening and is connected with the elastic element; when the powder-providing tank provides powder, the opening of the board-like element is connected with the powder-dropping opening, letting the constructive powder received in the corresponding recess of the powder-propelling roller to be output through the powder-dropping opening; when a powder-provision of the powder-providing tank has been finished, the board-like element displaces due to an elastic recovery force of the elastic element, letting the opening of the board-like element to be not connected with the powder-dropping opening.

5. The quantitative powder-providing module as claimed in claim 1, wherein the powder-providing tank has a back plate, a first inner wall, a first powder-stirring roller, a second powder-stirring roller, and a second inner wall; the constructive powder is stacked between a first side surface of the back plate and the first inner wall of the powder-providing tank, and is raising by the stirring of the first powder-stirring roller; and with the rotation of the second powder-stirring roller, the constructive powder is falling onto a position between another side surface of the back plate and the second inner wall of the powder-providing tank.

* * * * *